US010289704B1

(12) United States Patent
Andrews et al.

(10) Patent No.: US 10,289,704 B1
(45) Date of Patent: *May 14, 2019

(54) METHOD AND SYSTEM FOR IMPLEMENTING CATEGORICALLY ORGANIZED RELATIONSHIP EFFECTS

(71) Applicant: JPMorgan Chase Bank, N.A., New York, NY (US)

(72) Inventors: Burton W. Andrews, Dublin, OH (US); Mary Elizabeth Cain, Lewis Center, OH (US); Mark Pleasnick, Lewis Center, OH (US); Scott Michael Smith, Sunbury, OH (US); Art Weston, Columbus, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/632,556

(22) Filed: Jun. 26, 2017

Related U.S. Application Data

(63) Continuation of application No. 14/497,992, filed on Sep. 26, 2014, now Pat. No. 9,720,939.

(51) Int. Cl.
*G06F 17/30* (2006.01)

(52) U.S. Cl.
CPC .. *G06F 17/30289* (2013.01); *G06F 17/30327* (2013.01)

(58) Field of Classification Search
CPC .............. G06F 17/30289; G06F 17/30327
See application file for complete search history.

(56) References Cited

U.S. PATENT DOCUMENTS

| | | | |
|---|---|---|---|
| 5,692,107 A | 11/1997 | Simoudis et al. |
| 6,820,070 B2 | 11/2004 | Goldman et al. |
| 6,915,270 B1 | 7/2005 | Young et al. |
| 7,720,553 B2 | 5/2010 | Fayyad et al. |
| 7,756,804 B2 | 7/2010 | Bloom et al. |
| 7,953,762 B2 | 5/2011 | Argawal et al. |
| 7,966,345 B1 | 6/2011 | Funston |
| 8,185,486 B2 | 5/2012 | Eder |
| 8,229,973 B2 | 7/2012 | Agrawal et al. |
| 8,417,715 B1 | 4/2013 | Bruckhaus et al. |
| 8,533,235 B2 | 9/2013 | Argawal et al. |
| 8,583,686 B2 | 11/2013 | McGregor |
| 8,626,634 B2 | 1/2014 | Barsade et al. |
| 8,694,455 B2 | 3/2014 | Eder |
| 8,751,273 B2 | 6/2014 | Pinto et al. |

(Continued)

*Primary Examiner* — Huawen A Peng
(74) *Attorney, Agent, or Firm* — Hunton Andrews Kurth LLP

(57) ABSTRACT

According to an embodiment of the present invention, a computer implemented method and system for developing variables for model generation comprises: initiating, via an input to a computer, creation of a new variable for a dataset for model generation; extracting, by the computer, data relevant to the variable from one or more data sources; processing, by the computer, the extracted data to automatically generate an input variable; displaying, via a user interactive interface, the processed data relative to a target variable; modifying, via the user interactive interface, one or more parameters that define the input variable; executing, by the computer, the input variable by extracting code that captures the processing step to generate the input variable; and storing, in a database, the extracted code for the input variable.

14 Claims, 12 Drawing Sheets

(56) References Cited

U.S. PATENT DOCUMENTS

| | | |
|---|---|---|
| 8,818,932 B2 | 8/2014 | Nolan et al. |
| 8,898,592 B2 | 11/2014 | Loughlin |
| 2007/0162486 A1 | 7/2007 | Brueggemann |
| 2009/0259685 A1 | 10/2009 | Agrawal |
| 2011/0066454 A1 | 3/2011 | Rosauer et al. |
| 2011/0161938 A1 | 6/2011 | Marum |
| 2011/0191277 A1 | 8/2011 | Agúndez Dominguez et al. |
| 2012/0166486 A1 | 6/2012 | Visser |
| 2012/0203724 A1 | 8/2012 | Chun |
| 2012/0246316 A1 | 9/2012 | Ramu et al. |
| 2012/0323558 A1 | 12/2012 | Nolan |
| 2013/0239066 A1 | 9/2013 | Brugler |
| 2013/0317886 A1 | 11/2013 | Kiran et al. |
| 2013/0332232 A1 | 12/2013 | Agrawal et al. |
| 2015/0379426 A1 | 12/2015 | Steele |

METHOD AND SYSTEM FOR IMPLEMENTING CATEGORICALLY ORGANIZED RELATIONSHIP EFFECTS

RELATED APPLICATIONS

The subject application is a Continuation Application of U.S. application Ser. No. 14/497,992, filed Sep. 26, 2014, which is hereby incorporated by reference herein in its entirety.

FIELD OF THE INVENTION

The present invention relates generally to data preparation, and more specifically to a method and system for automating the data preparation phase for efficient model development.

BACKGROUND OF THE INVENTION

The data preparation phase of model development is an extremely difficult and time-consuming task which can substantially lengthen the turnaround time for a model to be built for a particular need. Additionally, a thorough understanding and interpretation of input data as it relates to the target behavior of interest for a given model is critical to model development but very difficult to obtain. An extensive amount of time, effort and data analysis are required to fully understand the impact and profile of each possible variable on the model output.

Other drawbacks may also be present.

SUMMARY OF THE INVENTION

Accordingly, one aspect of the invention is to address one or more of the drawbacks set forth above. According to an embodiment of the present invention, a method and system for data preparation for model development comprises: initiating, via an input to a computer, creation of a new variable for a dataset for model generation; extracting, by the computer, data relevant to the variable from one or more data sources; processing, by the computer, the extracted data to automatically generate an input variable; displaying, via a user interactive interface, the processed data relative to a target variable; modifying, via the user interactive interface, one or more parameters that define the input variable; executing, by the computer, the input variable by extracting code that captures the processing step to generate the input variable; and storing, in a database, the extracted code for the input variable.

In other exemplary embodiments, the preceding method may be performed using a system with a processor and a memory comprising computer-readable instructions which when executed by the processor cause the processor to perform the method steps.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

Figure 1:
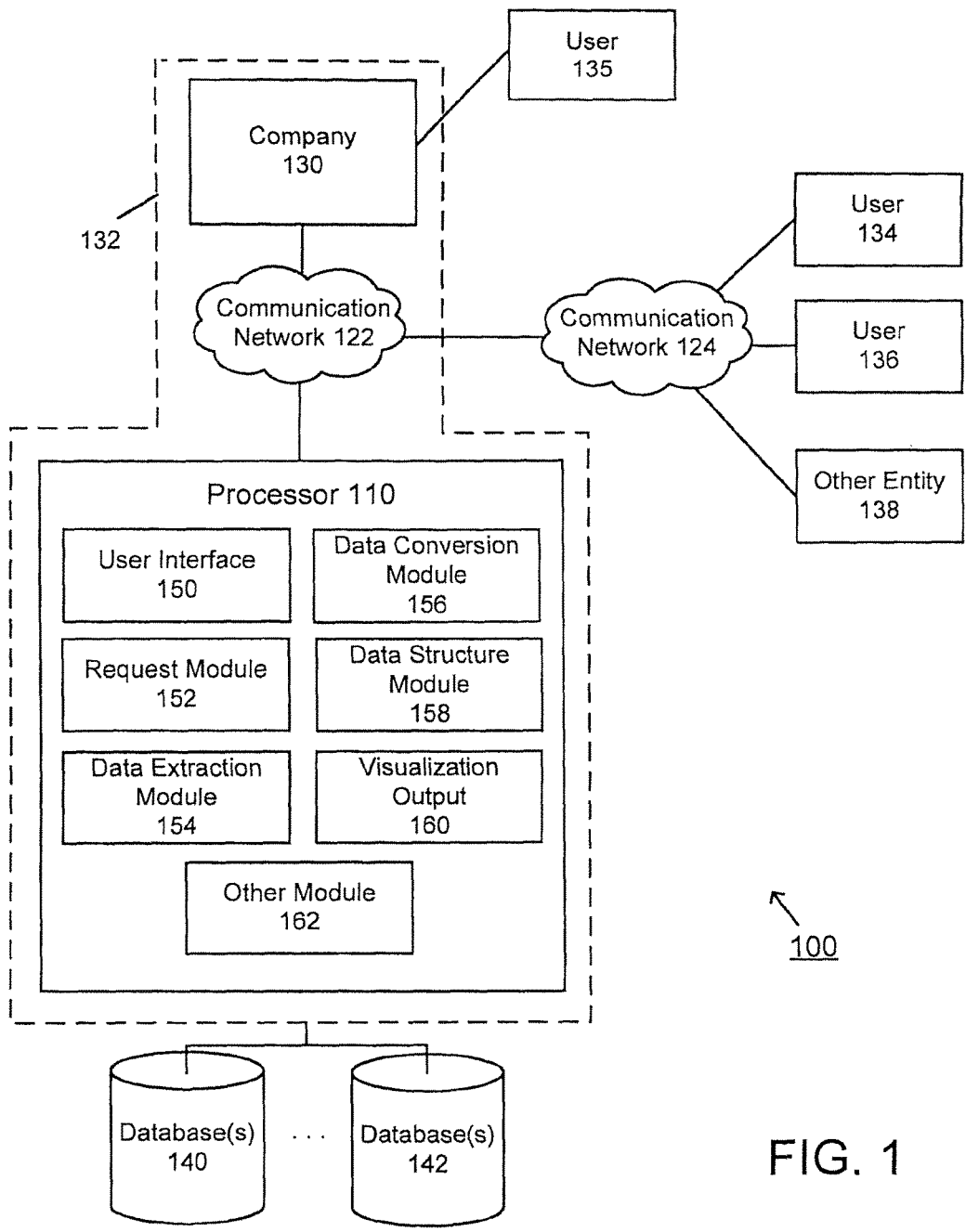
FIG. 1 is an exemplary diagram of a system for data preparation for developing models, according to an embodiment of the present invention.

An embodiment of the present invention is directed to an extensive, automated data extraction and transformation method and system that handles data preparation phase of model development in a consistent, reliable, efficient and extremely informative way. The output may include a regularly updated data structure containing variables that may be used in a given model. Another aspect of an embodiment of the present invention is directed to a comprehensive, interactive and portable data visualization toolset that enables a user to observe and interpret a profile of each variable as it relates to a model output behavior and/or a variable of interest (e.g., target variable).

An aspect of the invention is directed to creating customized data, allowing for fast development and rollout of customized models. An embodiment of the present invention gathers a variety of disparate data from multiple sources with varying types of data and continually produces consistent measurable data points. This raw input data may be transfointed to prepare the data for modeling purposes. For example, each continuous attribute may be divided into roughly equal parts, e.g., 10, based on population size and/or other factors. These discrete ranges may be pre-defined for each attribute or set of attributes. In addition, they may be defined on the fly through an interactive user interface. Corollary variables may be combined to form a new one. Such new variables have the potential to add significant predictive value to a model by capturing interactive effects not apparent in the individual variables. The methodology of an embodiment of the present invention quickly identifies which one or more attributes were significant in determining a particular behavior or result.

After data extraction, the data may be converted and/or transformed. This may involve converting the data from continuous values into categorical values. For example, a continuous variable may include variables represented by any number, e.g., an account balance may be $1012.62. Also, a continuous number may be grouped into categorical buckets: $0-$100, $100-$500, $500-$1000, $1000+, etc. A categorical variable may include a discrete set of choices such as color with choices of red, blue, or yellow. At this stage, logical attributes may be grouped together to create new, even stronger, composite attributes. To speed the process of data manipulation, each logical grouping of data attributes may be run independently and in parallel. Each of these logical chunks of data, or "decision trees," may be intentionally built separately from one other and may operate independently. These individual building blocks allow for newly created "decision trees" to be implemented with little or no impact other trees. Likewise, those "decision trees" that are not producing useful results may be easily removed. It should be noted that decision tree or tree data in general is merely one example and other forms of data may be implemented in accordance with the various embodiments of the present invention.

Another aspect of the invention is directed to an interactive interface that visualizes millions of rows of data across the various attributes from a categorically organized viewpoint. An embodiment of the present invention may also provide various attribute interactions in a presentation form that allows a user to quickly identify trends and anomalies. Visualization of the data may be composed of hundreds of graphs depicting populations as well as trend or response curves. Other graphics may be implemented. This visualization may also be used to define a data structure through user interaction. An embodiment of the present invention may extract data from the various sources, display the data to the user through a visualization tool, and then enable the user to modify, transform, combine and/or perform other action on the data to create model input variables.

An embodiment of the present invention may be directed to a system and method for dynamically creating the "trees" described above which allows modeling and profiling specific to individual needs. This is merely one example, other types of variables, including single independent and composite variables, may be implemented. The user is able to modify trees by splitting, combining and/or adjusting the existing tree structures as well as create new trees. The data may then be flowed through these new trees to have the structure and binning applied appropriately. The logical structure of the tree data may be displayed on a user interface and further enables the user to interact with the individual nodes of the tree or the tree as a whole. These interactions may be translated into the code necessary to construct the tree logic. The results of the user's actions may be presented in real time. Moreover, the user may make modifications to achieve the desired results.

The extracted data may be maintained historically with time stamps (or other indicia) to allow for referencing specific points in time or other events. For example, this data may be viewed on an individual period basis, such as one distinct period at a time. An embodiment of the present invention allows for data to be viewed across multiple time periods simultaneously. An embodiment of the present invention is directed to viewing, manipulating, transforming data and preparing it for input into a modeling algorithm. An exemplary type of input variable may include tree variables, for example, where the user may create them from combining other input variables together.

An embodiment of the present invention may include: (1) Back-end technology capable of storing, sorting and filtering large amounts of temporal tree data; and (2) Front-end method for displaying multiple time periods of data. The data may be in various forms, such as single independent variables as well as combinatory variables, e.g., tree variables. This maintains the visual relationship of the tree-node data while adding the concept of time. Accordingly, the various embodiments of the present invention provides a thorough understanding and interpretation of input data as it relates to target behavior of interest for a given model.

While the detailed description is directed to an exemplary application involving data preparation of model development, the various embodiments of the invention may be applied to other scenarios and applications involving data management. Other applications may be applied in varying scope.

FIG. 1 is an exemplary diagram of a system for data preparation for developing models, according to an embodiment of the present invention. A system 100 of an embodiment of the present invention may include a Processor 110, which may be stand alone, hosted by an entity, such as a company, corporation, merchant, retailer, financial institution, service provider, bank, etc. For example, Processor 110 may be affiliated or associated with a company, financial institution and/or other entity with data preparation and modeling concerns. In an exemplary embodiment involving a company such as 130, the company may host or support the Processor 110. In this example, the application of the various features of an embodiment of the present invention may appear to be performed by the company, as a single consolidated unit, as shown by 132.

According to another example, Processor 110 may be separate and distinct from Company 130. For example, Company 130 or other entity may communicate to Processor 110 via a network or other communication mechanism, as shown by 122. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations. Processor 110 may be accessed via a mobile device, tablet, phone and/or other device. Processor 110 may also reside on a remote device, at a remote location, client site, etc. Other architectures may be realized. The functionality discussed herein—in whole and/or in part—may be provided via a mobile application.

Processor 110 may access databases and/or other sources of information for data extraction and model development. For example, Processor 110 may access and/or maintain Databases 140, 142. Databases 140 and 142 may include data, such as attributes, characteristics, variables and/or other relevant data. While each database is illustrated as a single database in the exemplary figure, the system may include multiple databases at the same location or separated through multiple locations. The databases may be further combined and/or separated. In addition, the databases may be supported by Company 130 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Processor 110 may communicate with various entities, including various types of users, represented by User 134, User 135, User 136, and/or Other Entities 138. Communication may be provided by Communication Network 122, 124 and/or other communication mechanism. In addition, Processor 110 may have access to other sources of data and/or data feeds that identify other metrics and/or information that may be relevant for employee management in accordance with an embodiment of the present invention. As shown, User 135 may communicate directly with Company 130 and/or with an Entity 132.

Processor 110 may include various modules and interfaces for data preparation and model development, according to an embodiment of the present invention. Processor 110 may include User Interface 150, Request Module 152, Data Extraction Module 154, Data Conversion Module 156, Data Structure Module 158, Visualization Output 160 and/or other modules, interfaces and/or processors, as represented by Other Module 162. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

An embodiment of the present invention is directed to an extensive, automated data extraction and transformation process that handles the data preparation phase of model development in a consistent, reliable, efficient and extremely informative way. The output is a regularly updated data structure containing variables that may be possibly used in a given type of model. Additionally, a comprehensive, interactive and portable data visualization toolset provides the ability for a modeler, user or client to rapidly observe and interpret the profile of variables as they relate to a model output behavior/variable of interest. The visualization toolset of an embodiment of the present invention may be used in the data preparation phase. For example, the user may, through the visualization, manipulate the input data to create variables for a model.

User Interface 150 represents a customizable user friendly front end interface. The information displayed may be based on the user's identity, roles, permissions, security level, etc. The user may further customize the in fo Illation displayed by priority, notifications and/or other preferences. User preferences may be user defined and/or automatically applied.

According to another embodiment of the present invention, Processor 110 may host a website or other electronic interface or other input where users can access data as well as provide data. For example, a financial institution, service provider and/or other entity may access information through an interface to view data, submit requests, view reports, provide data and/or perform other actions. As discussed above, an application for a mobile device may be provided. For example, the processor may reside on a mobile device.

Request Module 152 may receive a request from one or more users. The request may be received via a user interface and/or other form of communication. The request may be a specific request to create a new variable for a model. For example, a model may be generated to determine the effect of affluence on new mobile phone products. Also, a model may be developed to determine which age group is likely to open a checking account (or other financial product). Other exemplary requests may involve attrition models, new product models, loyalty models, marketing models, etc. The request may also include a request to understand how certain data relates to the behavior to be predicted. For example, a client may submit requests for a large number of models within a short time frame. The request may also be from the user, client, customer, and/or other entity.

Data Extraction Module 154 may extract customer data from various sources. An embodiment of the present invention is directed to building a process that creates customized data, allowing for the fast development and rollout of customized models. The system gathers, accesses and/or retrieves a variety of disparate data from multiple sources with varying types of data and continually produce consistent measurable data points. This raw input data may be transformed to prepare the data for modeling purposes. For example, each continuous attribute may be divided, e.g., into roughly equal parts based on population size (or other factor or consideration). These discrete ranges may be predetermined and/or potentially reconfigured by the user. Corollary variables may be combined to form a new variable. The new variable adds significant value by showing the effects of the relationship versus single attributes alone.

Data Conversion Module 156 may take the extracted data and convert it to a different form for further analysis. An embodiment of the present invention transforms the extracted data for use in building a model.

An embodiment of the present invention implements data extraction broken up into logical pieces. These pieces may be mostly unique, thereby reducing the time and effort spent on gathering redundant attributes. These logical pieces, once put into an execution order map, may then be bundled to allow parallel pulls of the source data in an efficient manner. An embodiment of the present invention is directed to ensuring that attributes that are inputs to future attributes are pulled before they are needed. In addition, to compensate for system errors, an auto recovery feature may be implemented. Each of these data extraction processes may check for any system error and/or other errors. If an error (or a potential error) is detected, the system may resubmit the data extraction request as many times as needed until valid data is retrieved.

After data extraction, an embodiment of the present invention may convert the extracted data from continuous values into categorical values. In this stage, logical attributes may be grouped together to create new, even stronger, composite attributes. To speed the process of data manipulation, each logical grouping of data attributes may be run independently and in parallel.

According to an exemplary illustration, each of these logical chunks of data, or "decision trees," may be built separately from one other and may operate independently. These individual building blocks allow for newly created "decision trees" to be implemented with little or no impact on other trees. Likewise, those "decision trees" that are not producing useful results may be easily removed. This may be performed by a manual operation or an automatic tracking of model performance over time. Due to the inherent units that these "decision trees" create, they too can be executed in parallel. This further enhances the execution of the process as a whole and further decreases running time.

The process can be traditionally very complex. However, with controlling code, the execution may be initiated simply by pressing a couple buttons. This allows for easy handoff off of the process from one person to another.

Data Structure Module 158 may provide data profiles to users. For example, an embodiment of the present invention provides an effective profile of data relative to a target level of interest such that the user can observe visual depictions of each and every variable (or group or type of variables) that could be considered in a model. Thus, the user may gain a thorough understanding into the behavior that is being predicted.

An embodiment of the present invention may be applied to various types of variables in the data preparation phase. Exemplary data structures may include a tree structure where nodes may be collapse, expanded and/or modified. Data Structure Module 158 may include visualization enhancements, such as dynamic tree structures, large-data temporal analysis and others. An exemplary illustration may involve dynamically creating data structure, e.g., "trees," etc., to allow modeling and profiling specific to individual needs. In this example, the user may modify the data structure by splitting, combining and/or adjusting the existing tree structures as well as create new trees. The data may then flow through these new trees to have the structure and binning applied appropriately. A graphical user interface (GUI) may represent the logical structure of the data structure, e.g., tree data. The user may interact with the individual nodes of the tree or the tree as a whole. These interactions may be translated into the code to construct the tree logic. The results of the user's actions may be presented in real time. Further, the user may make modifications to achieve the desired results. According to an example, the GUI allows the complexities of the tree creation to be hidden from the end user. It also performs validation as the user interacts to provide accurate final reports or other outputs.

According to another embodiment, visual enhancements may include large-data temporal analysis. The extracted data may be maintained historically with time stamps to allow for referencing specific points in time. Other annotations or indicia may be used. Typically, this data may be viewed on an individual period basis, e.g., one distinct period at a time. An embodiment of the present invention allows for this tree data to be viewed across multiple time periods simultaneously. The user may select the start and length of the time period, e.g., six months of data starting on Jan. 1, 2011.

An embodiment of the present invention may include Back-end technology as well as Front-end technology. The Back-end technology may provide for storing, sorting and/or filtering large amounts of temporal tree data. This method takes into account the nature of the data's tree structure and uses it to speed its operation. The Front-end technology may be directed to displaying multiple time periods of tree data. This maintains the visual relationship of the tree-node data while adding the concept of time.

Visualization Output 160 provides the ability to visualize millions of rows of data (or more) across thousands of various attributes from a categorically organized viewpoint. This methodology of an embodiment of the present invention shows visually, the various attribute interactions in a presentation form where trends and anomalies may be identified.

To further enhance performance of the visualization, the millions of raw households may be summarized into categories, e.g., thousands of categories. This smaller summary may enable the visualization to be created on a computing device, e.g., desktop computer, processor, etc. Visualization of the data may be composed of hundreds of graphs depicting populations and trend or response curves. Other forms of visualization may be implemented on various types of mobile devices and processors.

According to an embodiment of the present invention, data visualization may be provided via an interface, such as a globally accessible web page. Having a web-based front-end, for data visualization, gives accessibility for other departments to be able to "self-service" various features not otherwise available to them. Other groups may access and create custom reports profiling customers. They may be able to subset the population by many different characteristics as most useful or valuable to them. An embodiment of the present invention is directed to creating a custom solution that provides visualizations that best fit the needs of the client. For example, a user may broadcast to a larger audience in terms of individuals and departments, using a web-based solution that allows for portability to many devices. Any device with access to a web browser may display and interact with these reports and interfaces. It is independent of system architecture and operating system. This includes desktop PCs and mobile devices such as tablets and mobile phones.

Figure 2:
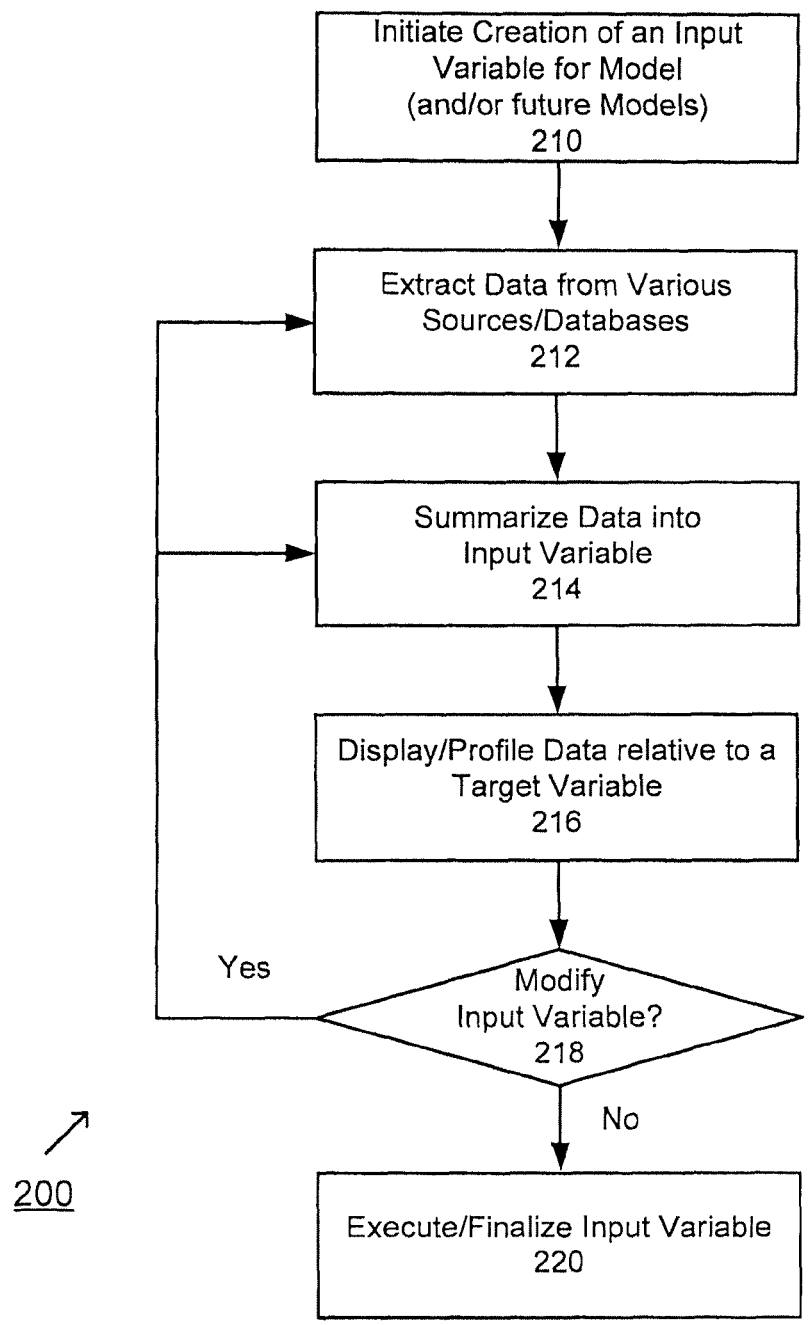
FIG. 2 is an exemplary flowchart illustrating a method for data preparation, according to an embodiment of the present invention.

FIG. 2 is an exemplary flowchart illustrating a method for data preparation, according to an embodiment of the present invention. At step 210, a request may be received by the system of an embodiment of the present invention. At step 212, a data extraction step may be performed. At step 214, data may be summarized into a single input variable. At step 216, the data structure may be provided. At step 218, the input variable may be modified. At step 220, the input variable may be executed. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a user may initiate creation of a variable for a current model or a future model. For example, a user may request to add a new variable. This new variable may be a new addition to a main data set of potential model variables that a developer (or other user) may use when creating a model According to an exemplary application, a user may want to develop a variable relating to how many people own SUVs. This variable may be deemed relevant to a target variable relating to how likely a customer is to open an auto loan.

Other variables may relate to marketing campaigns. For example, a financial institution may desire to determine the best communication channel for a particular product offering for customers. The product may be offered by direct mail, email, phone call, text message, social media. The offer may include a checking account offer, savings products, online bill pay, etc. For a new account offer, the financial institution may want to decide which households to send mail to. Models may be generated to better understand and predict household behavior. The request may also relate to predicting attrition, e.g., who is most likely to close an account, etc.

At step 212, a data extraction step may be performed. The extracted data may include data, such as demographics (e.g., age, income, education, occupation, etc.), product relationship (e.g., products owned, balances, etc.). According to an exemplary application, data relevant to households having SUVs may be pulled.

At step 214, the extracted data may be summarized into a single input variable. At this step, a data transformation or conversion may be performed. The data may be converted from continuous values into categorical values where attributes may be grouped together to create new, even stronger, composite attributes. In addition, each grouping of data attributes may be run independently and in parallel. Also, data transfoiination may be directed to transforming data into a consistent format. According to an exemplary application, data such as types of SUVs, the model of the SUV, year of the SUV, whether it was purchased or leased, cost of SUV, etc., may be categorized.

At step 216, the data structure may be provided via an interactive interface. The user may visualize the data as to how it relates to a target variable (e.g., who is likely to open an auto loan). An embodiment of the present invention may be directed to a profile tool that enables a user to analyze the profile data, such as customer profiling. This may include analyzing the profile of a household that is more likely to open a checking account. The profiling tool enables a user to digest data quickly due to the way the data is presented. This provides the ability to effectively choose which variables should be used in a model. A visualization output may be provided. The output may include status graphics. The output may also be provided by a web based interactive GUI that allows the user to dynamically modify variables and characteristics. For example, an embodiment of the present invention may compare two or more groups, such as affluent vs. low income. An embodiment of the present invention provides a customized view of data that may be further modified and manipulated to better achieve the desired model.

At step 218, the input variable may be modified. A user may redefine and/or change components of data interaction for the input variable. Modification may involve extracting data and/or summarizing data.

At step 220, the input variable may be executed. At this step, the dynamically created variable may be put into production by extracting the code to create the variable. This code may then be integrated into a model data creation system that may then be run on a regular basis. An embodiment of the present invention may then produce the input variable into code (or other form) such that it can be updated and recreated/refreshed to facilitate ongoing model development. For example, after the input variable is created, the user may want to use the same variable (or a variation of the variable) in an entirely different model. Rather than recreating this variable for each model or modeling instance, the user may simply retrieve and refresh the previously created variable.

Figure 3:
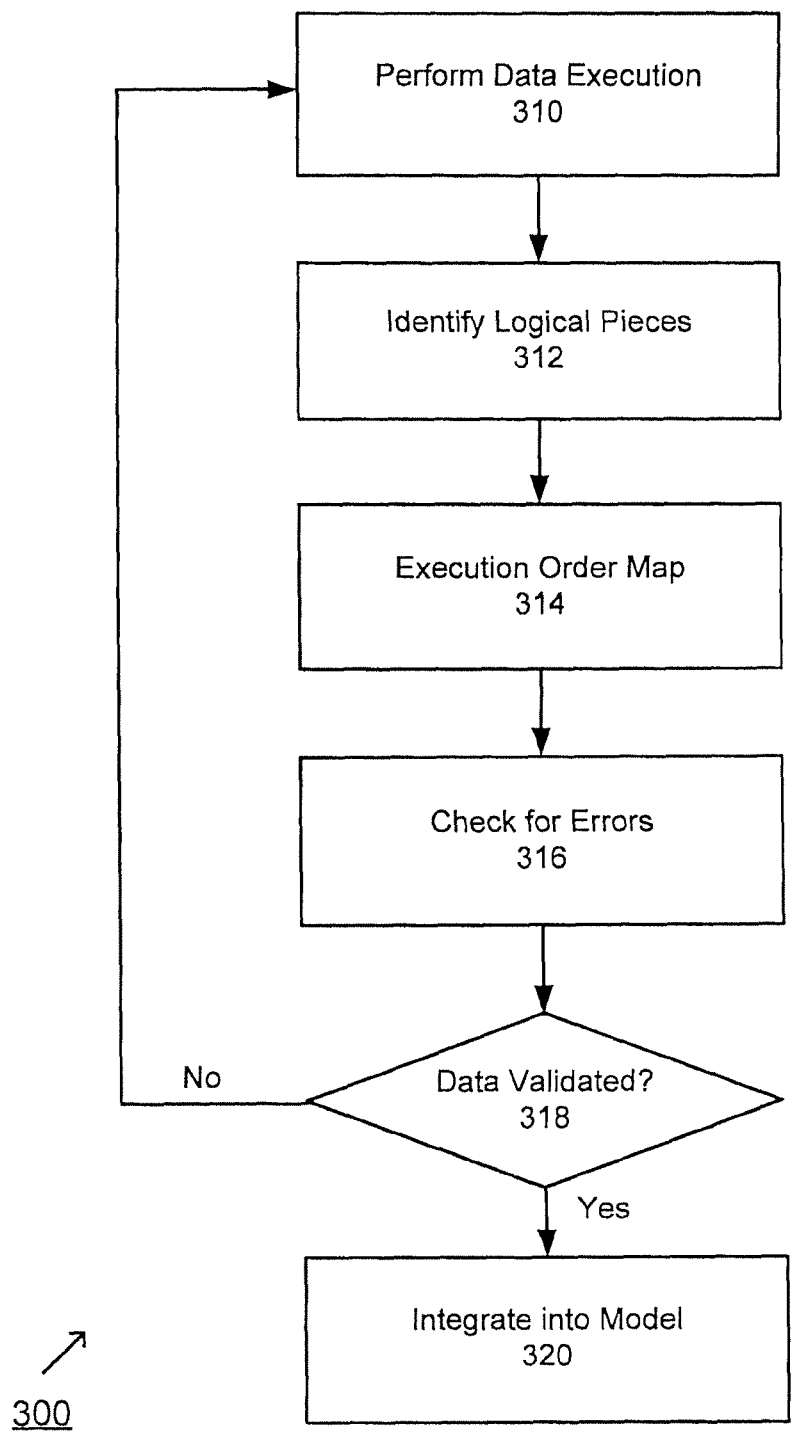
FIG. 3 is an exemplary flowchart illustrating a method for data execution, according to an embodiment of the present invention.

FIG. 3 is an exemplary flowchart illustrating a method for data execution, according to an embodiment of the present invention. According to an embodiment of the present invention, the process of developing an input variable may be captured and coded so that a user may be able to refresh the input variable with updated data. The input variable may then be used in a model and/or other process. At step 310, a data execution process for an input variable may be initiated. At step 312, the data may be divided into a plurality of logical pieces. At step 314, an execution order map may be provided. The execution order map may represent a set of instructions for how the data extraction process should execute in teims of which pieces or components should run and when. At step 316, an error check step may be performed. At step 318, whether input variable has been validated may be determined. If no, data extraction process may continue at 310. If yes, the process may proceed to integrating the variable into a model and/or added to a data set of potential model variables, at 320. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
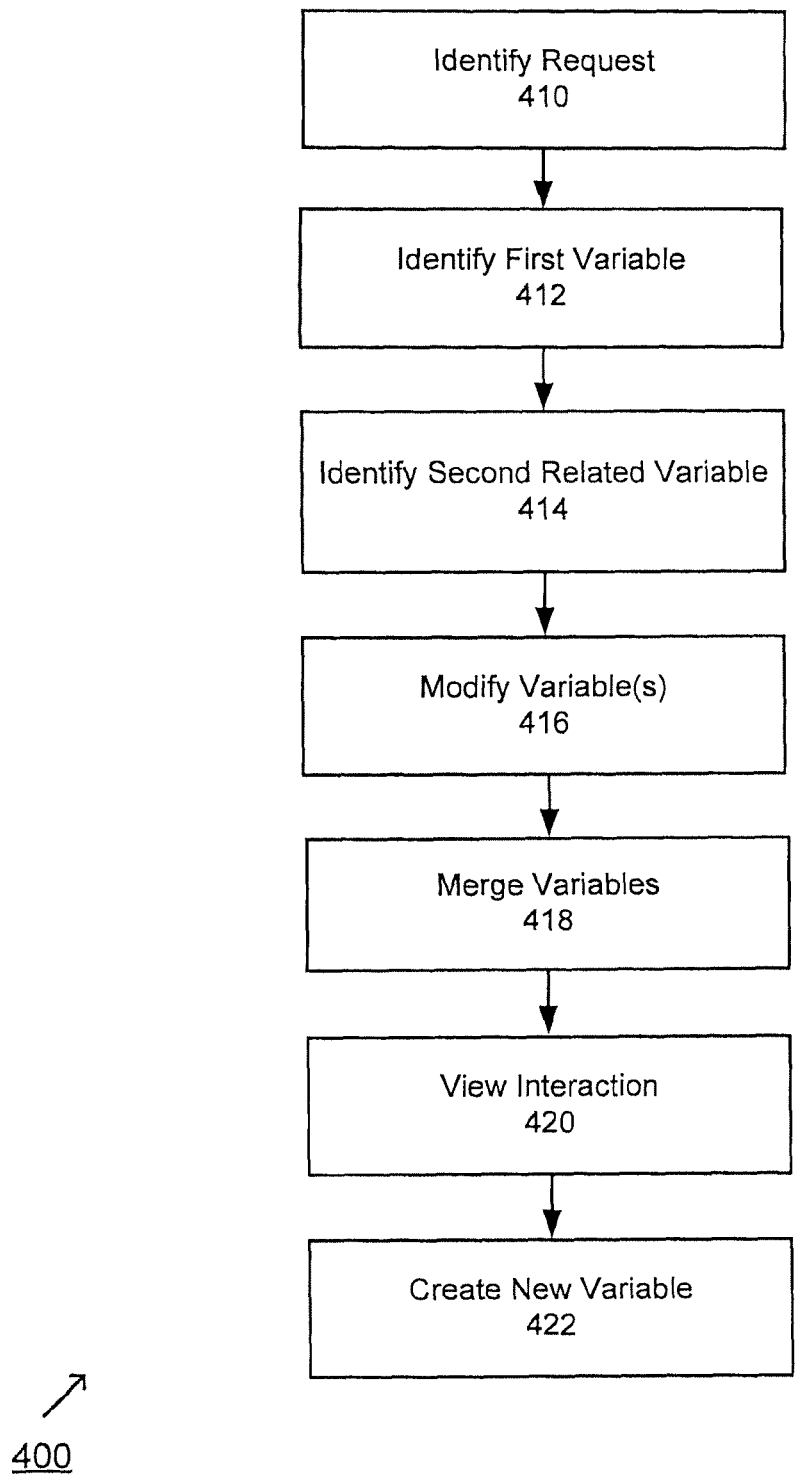
FIG. 4 is an exemplary flowchart illustrating a method for creating a new variable, according to an embodiment of the present invention.

FIG. 4 is an exemplary flowchart illustrating a method for creating a new variable, according to an embodiment of the present invention. This illustrates an exemplary application of a composite variable. Other types of variables may be implemented by an embodiment of the present invention. At step 410, a request may be received and identified. At step 412, a first variable may be identified. At step 414, a second variable may be identified. At step 416, the variables may be modified. At step 416, the two variables may be merged. At step 418, an interaction of the two variables may be provided. Also, the user may modify the variables via a feedback loop. At step 420, the new variable may be created. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 410, a request may be received and identified. Based on the request, appropriate data may be accessed or otherwise retrieved. Individual customer data may be accessed from a central database or repository. This repository may contain information about specific customers. New attributes related to the customer, such as neighborhood or block group size, may be joined to a list of customers. As the new attribute may vary widely (e.g., value range between 1 and 5000), it may be grouped into discrete buckets or bins of data. These bins may be deciled resulting in 10 roughly equal populations (or segments). This allows the data to be both visually readable and simplifies the input choices used for modeling.

A response variable may be visualized relative to the input data (e.g., line curve, bar graph, other graphic or representation). This gives a quick way to visually see that low population locations behave differently than high density populations.

Figure 5:
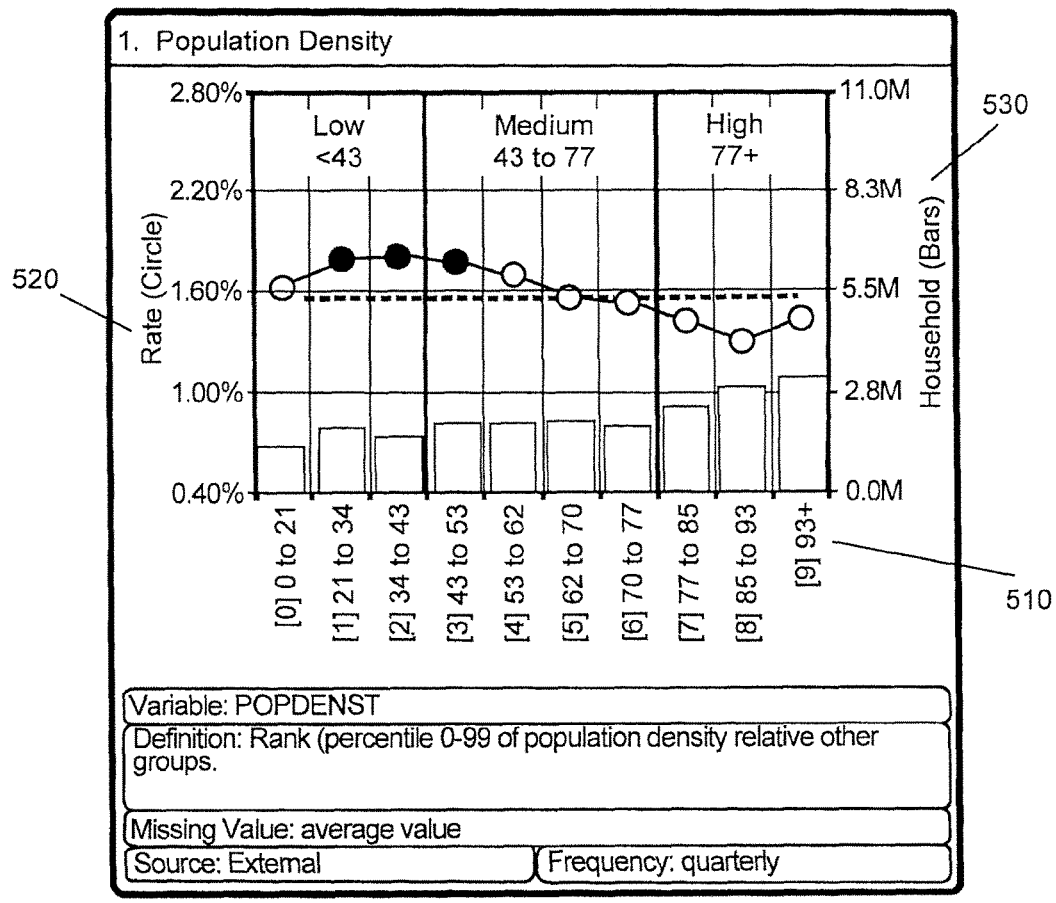
FIG. 5 is an illustration of an exemplary screenshot of a first variable, according to an embodiment of the present invention.

At step 412, a first variable may be identified. FIG. 5 is an illustration of an exemplary screenshot of a first variable, according to an embodiment of the present invention. In this example, FIG. 5 illustrates population density for a geographical unit, e.g., a local area, subset of a zip code, etc. Population density refers to a measurement of population per unit area or unit volume and generally represents the number of people per unit of area. Population density provides a rank (e.g., percentile 0 to 99) of population density for a particular geographical unit relative to other geographical units. As shown along the X axis at 510, the population density may be segmented into 10 sections and further segmented by Low, Medium and High. In this example, Low is less than 43; Medium is between 43 and 77 and High is greater than 77. The Y axis on the left at 520 illustrates a rate, shown by the circles. The rate at 520 represents the percentage of customers who are likely to open a checking account. The highest values are represented by a solid circle. Other graphics may be used to shown further variations and segmentations of the data. The bars shown along the right at 530 represent household for each segment (e.g., in millions). As shown in FIG. 5, a missing value may indicate how records are handled if they are missing data for the input variable. In this example for population density, if a record is missing, an average value may be used. According to another example, density for the next larger sized geography (e.g., county or state) may be used. Rate may represent a percent of households that perform the target action being predicted by the model (e.g., open a checking account) in that particular categorical bin.

In the example illustrated in FIG. 5, a user may seek to generate a new variable involving population density. The target variable may relate to who is most likely to open a checking account. Using the visualization shown by FIG. 5, a user may make modifications, such as change bin range, change from 10 bins to 15 bins, redistribute so the bins are even, etc.

Figure 6:
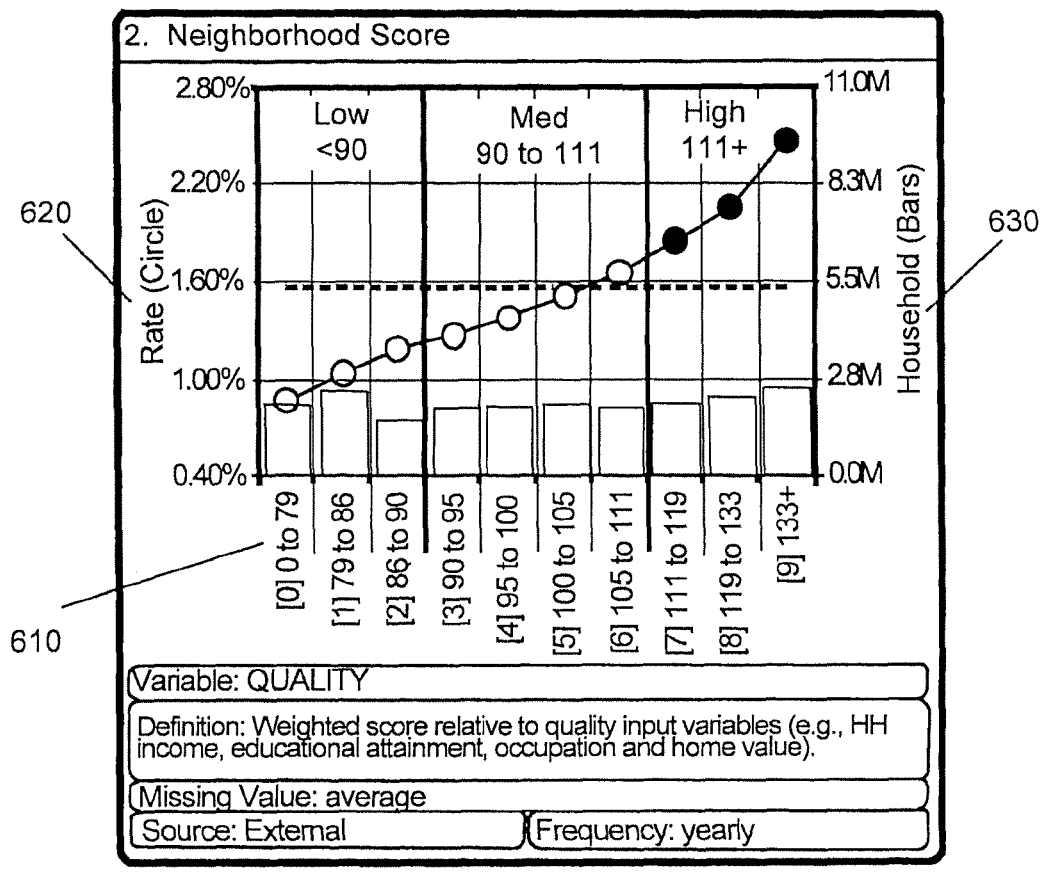
FIG. 6 is an illustration of an exemplary screenshot of a variable, according to an embodiment of the present invention.

At step 414, a second variable may be identified. FIG. 6 is an illustration of an exemplary screenshot of a variable, according to an embodiment of the present invention. In this example, FIG. 6 illustrates neighborhood score. This illustrates a weighted score of neighborhoods relative to input variables. In this example, the input variables may include household income, education attainment, occupation and home value. Other variables may be used to define neighborhood score. The range in this exemplary embodiment is between 63-170, with the US average being 100. As shown along the X axis at 610, the range may be segmented into 10 sections. The Y axis illustrates a (neighborhood score) rate at 620, shown by the circles. The rate at 620 represents the percentage of customers who are likely to open a checking account. The highest values are represented by a solid circle. In this example, the highest rates are in the last three segments, e.g., High 111+. Other graphics may be used to shown further variations and segmentations of the data. The bars shown along the right at 630 represent household for each segment (e.g., in millions). As shown in FIG. 6, the higher the neighborhood score, the higher chance to open a checking account.

At step 416, the user may modify one or more variable through, for example, additional transformations, such as changing the binning cuts or definitions. Other modifications and/or revisions may be applied.

Figure 7:
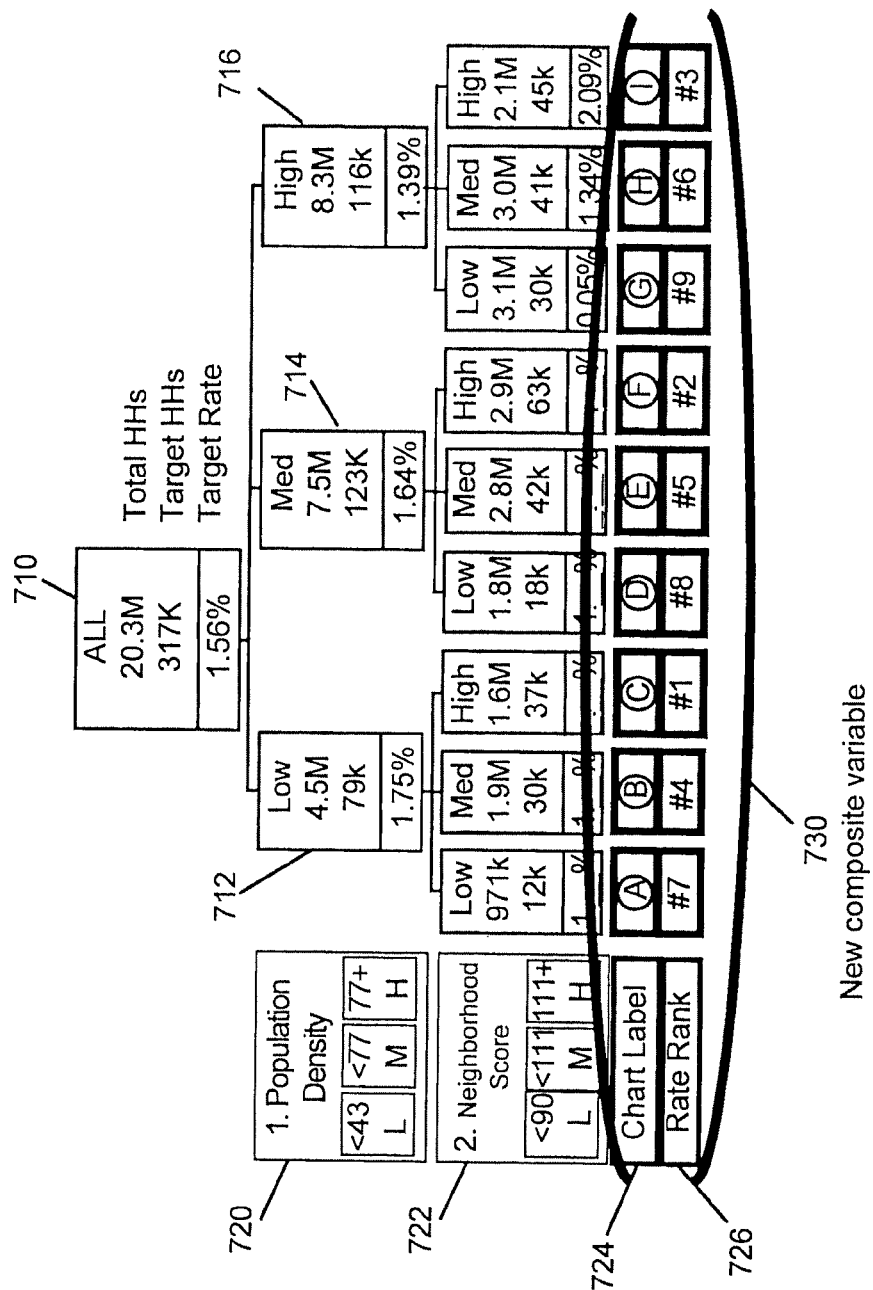
FIG. 7 is an illustration of an exemplary screenshot of a composite variable, according to an embodiment of the present invention.

At step 418, the two variables may be merged. FIG. 7 is an illustration of an exemplary screenshot of a composite variable, according to an embodiment of the present invention. In this example, Population Density is merged with Neighborhood Score. A total household and target household are shown at 710. The target household corresponds to the household segments shown in FIGS. 5 and 6 for each variable. The target rate is shown at as 1.56%, which is based on the target household in relation to the total household. The Low, Medium and High segments, as shown by 720, correspond to the Population Density shown in FIG. 5. From there, the Neighborhood Score is applied where the Low, Medium and High segments, as shown by 722, correspond to Neighborhood Score shown in FIG. 6. The merged values are represented at 730 as new composite variable. Chart label 724 and Rate Rank 726 are shown for the two interacted variables. The total households at 710 are broken up into segments 712, 714 and 716 based on the first input variable groupings, shown in FIG. 5. Each of those segments are then based on groupings of the second variable shown in FIG. 6. For example, segment 712 is divided into low, medium and high based on the groupings of Neighborhood Score.

Figure 8:
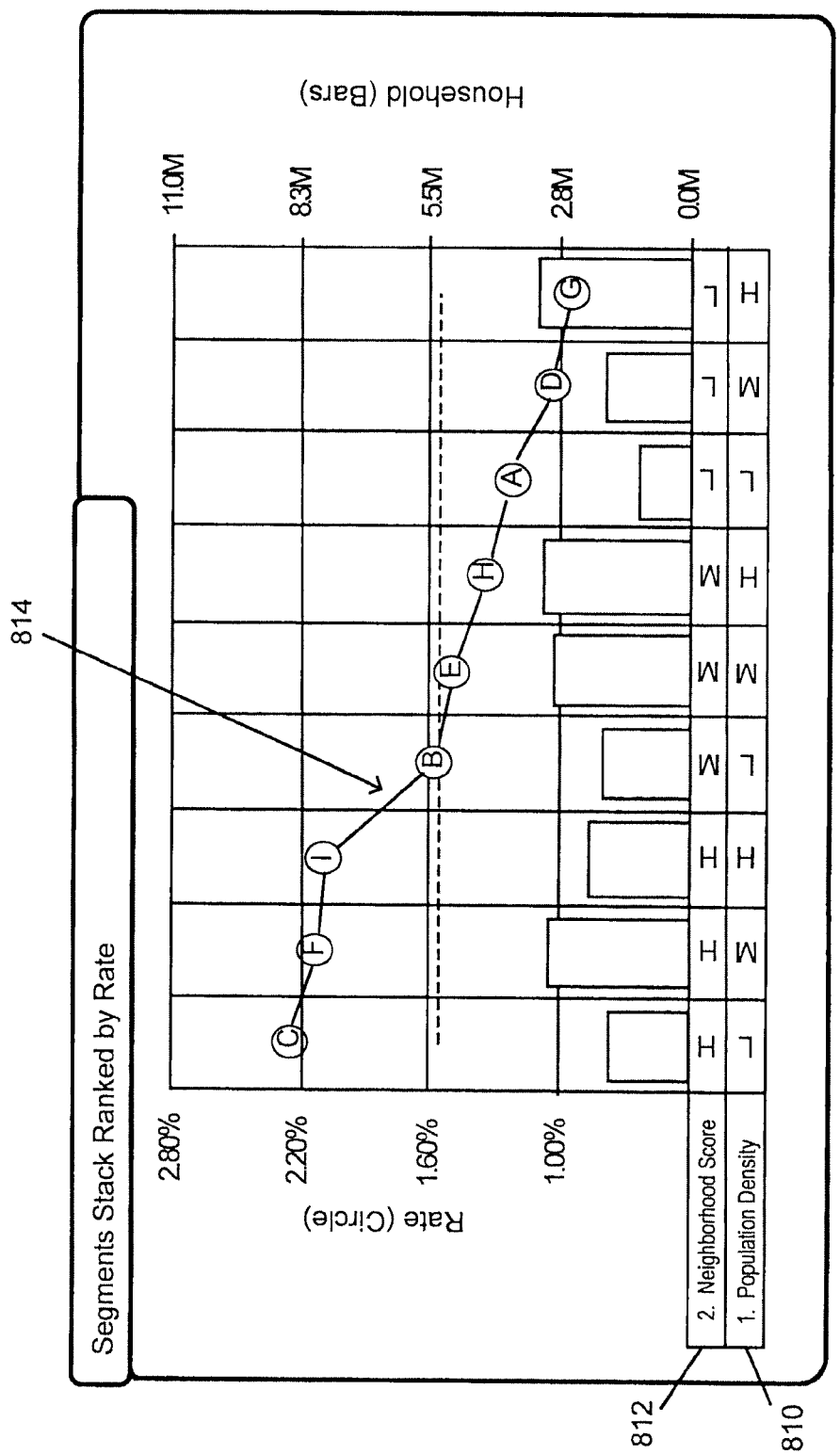
FIG. 8 is an illustration of an exemplary screenshot of a variable interaction, according to an embodiment of the present invention.

At step 420, an interaction of the two variables may be provided. While these individual variables are useful by themselves, additional strength may come from logically combining related variables together to get new insight into customer behavior. FIG. 8 is an illustration of an exemplary screenshot of a variable interaction, according to an embodiment of the present invention. FIG. 8 demonstrates two related variables and how they are combined into a new enhanced, or composite, variable. This new composite variable can have new meaning or predictability attributes. FIG. 8 shows the composite variable and its response curve. The rate is represented by line 814, and circles which correspond to the segments shown in FIG. 7. Also shown along the X axis is the corresponding household, e.g., bars. FIG. 8 illustrates how the variables interact with each other, as shown by 810 and 812. In FIG. 7, point C is ranked as number 1. In FIG. 8, point C is shown as the highest point at over 2.20%. Where Population Density is low and Neighborhood Score is high as shown by point C, the rate is over 2.20%. On the low side, where Population Density is high and Neighborhood Score is low, the rate is low as shown by point G, around 1.00%. Also, after viewing the interaction, the user may further modify or otherwise revise one or more variables via a feedback loop.

At step 422, the new variable may be created. The new variable may be used for other applications and requests as well. The new variable may be further modified in an iterative manner. An embodiment of the present invention then produces the new variable into code (or other form) such that it can be updated and recreated/refreshed to facilitate ongoing model development. For example, after the new variable is created, the user may want to use the same variable (or a variation of the variable) in an entirely different model. Rather than recreating this variable for each model or modeling instance, the user may simply retrieve and refresh the previously created variable.

An exemplary embodiment of the present invention may be directed to evaluating target variables. For example, a request may be to evaluate a response to a checking offer. In other words, a financial institution may want to analyze what variables are critical or most influential in a customer's response to a checking offer. Other requests may include a request to evaluate a new product, e.g., which customers will be most responsive to a particular new offer. Using this information, a service or product provider may effectively use resources to target on the most receptive segment of customers and reduce or eliminate resources that would be wasted on other customers.

In this exemplary embodiment, the user may want to see how distance to banking center and distance to ATM affects a customer's response to a checking offer. This may also be referred to as network strength. For this request, a user may want to take an independent view of each variable: (1) distance to Banking Center and (2) distance to ATM.

Figure 9:
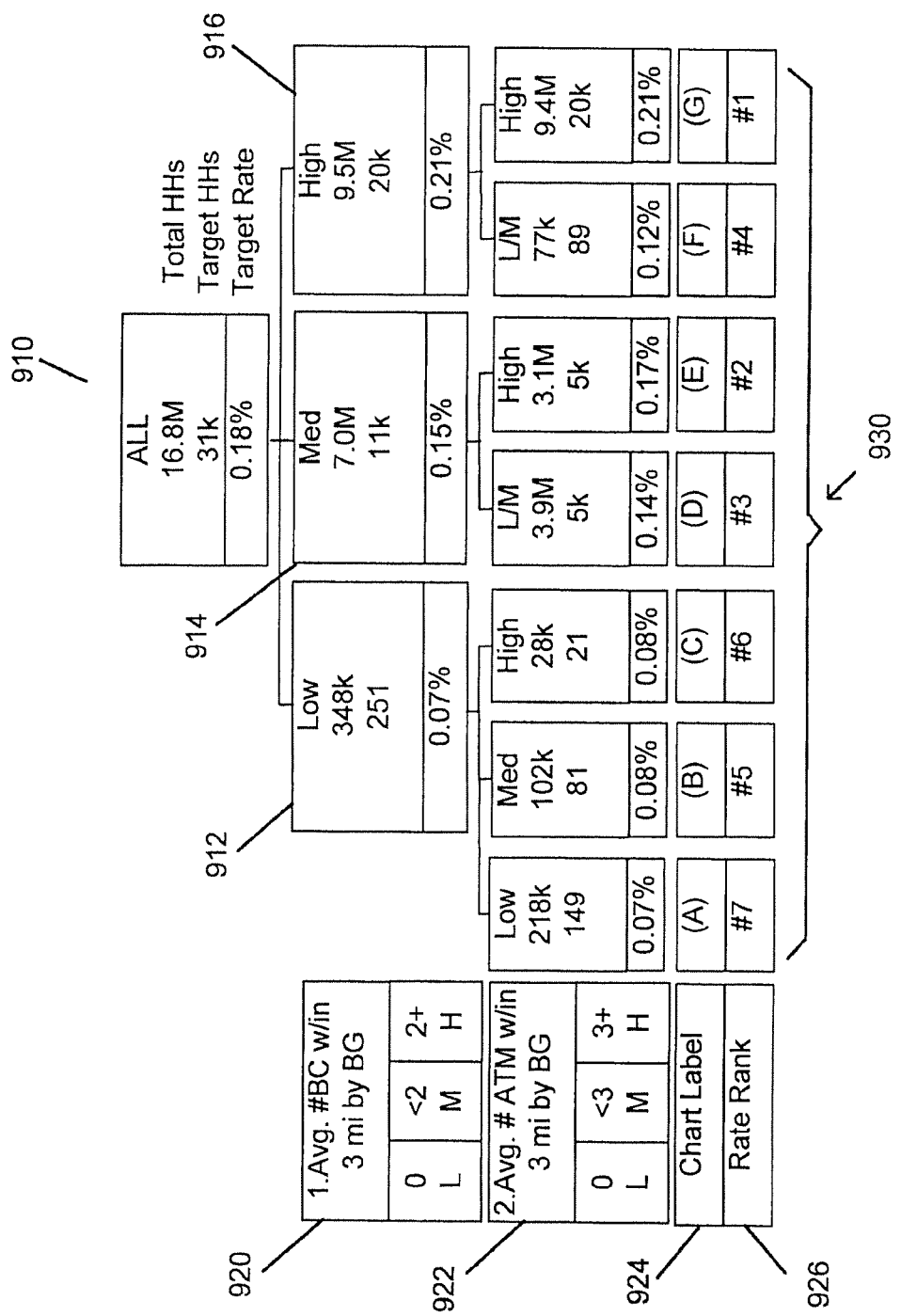
FIG. 9 is an illustration of an exemplary screenshot of a combined variable, according to an embodiment of the present invention.

FIG. 9 is an illustration of an exemplary screenshot of a combined variable, according to an embodiment of the present invention. A total household and target household are shown at 910. The target household corresponds to the household segments for each variable. The target rate is shown at as 0.18%, which is based on the target household in relation to the total household. In this example, target rate represents a percentage of households in that bucket that open a checking account. The Low, Medium and High segments, as shown by 920, correspond to the Average number of Banking Centers within 3 miles. From there, the Average number of ATMs within 3 miles is applied with Low, Medium and High segments, as shown by 922. The merged values are represented at 930. Chart label 924 and Rate Rank 926 are shown for the two interacted variables.

As shown in FIG. 9, a higher response is noticed when the household has the least amount to travel. An embodiment of the present invention provides the ability to rank metric "response" by means of the "tree" variable (which may include a combination of two or more independent variables). In the example of measuring checking response offers, the "tree" variable indicates that Banking Centers are a heavier driver of response. FIG. 9 illustrates that a high number of Banking Centers with only a medium number of ATMs has a larger response rate than a high number ATMs with a medium number of Banking Centers.

Figure 10:
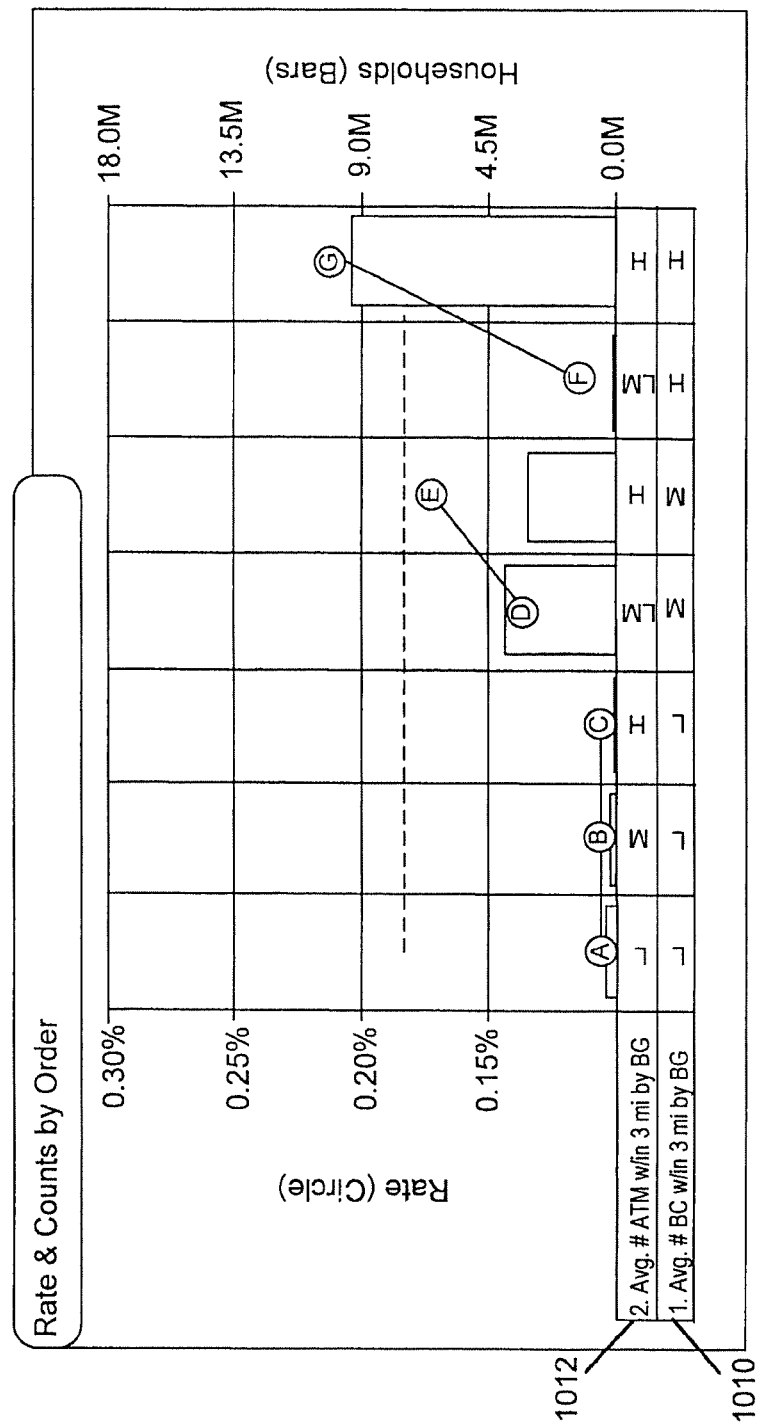
FIG. 10 is an illustration of an exemplary screenshot of a variable interaction, according to an embodiment of the present invention.

FIG. 10 is an illustration of an exemplary screenshot of a variable interaction, according to an embodiment of the present invention. FIG. 10 illustrates the combined variable of FIG. 9 by tree order, according to an embodiment of the present invention. FIG. 10 demonstrates two related variables and how they are combined into a new enhanced, or composite, variable. This new composite variable can have new meaning or predictability attributes. FIG. 10 shows the composite variable and its response curve. The rate is represented by the circles which correspond to the segments shown in FIG. 9. Also shown along the X axis is the corresponding household, e.g., bars. FIG. 10 illustrates how the variables interact with each other, as shown by 1010 and 1012. Where ATM number is high and BC number is high as shown by point G, the rate is over 0.20%. On the low side, regardless of the ATM number, when the BC number is low, the rate is consistently low as shown by point A, B and C, just above 0%. The order corresponds to the tree order specified in FIG. 9.

Figure 11:
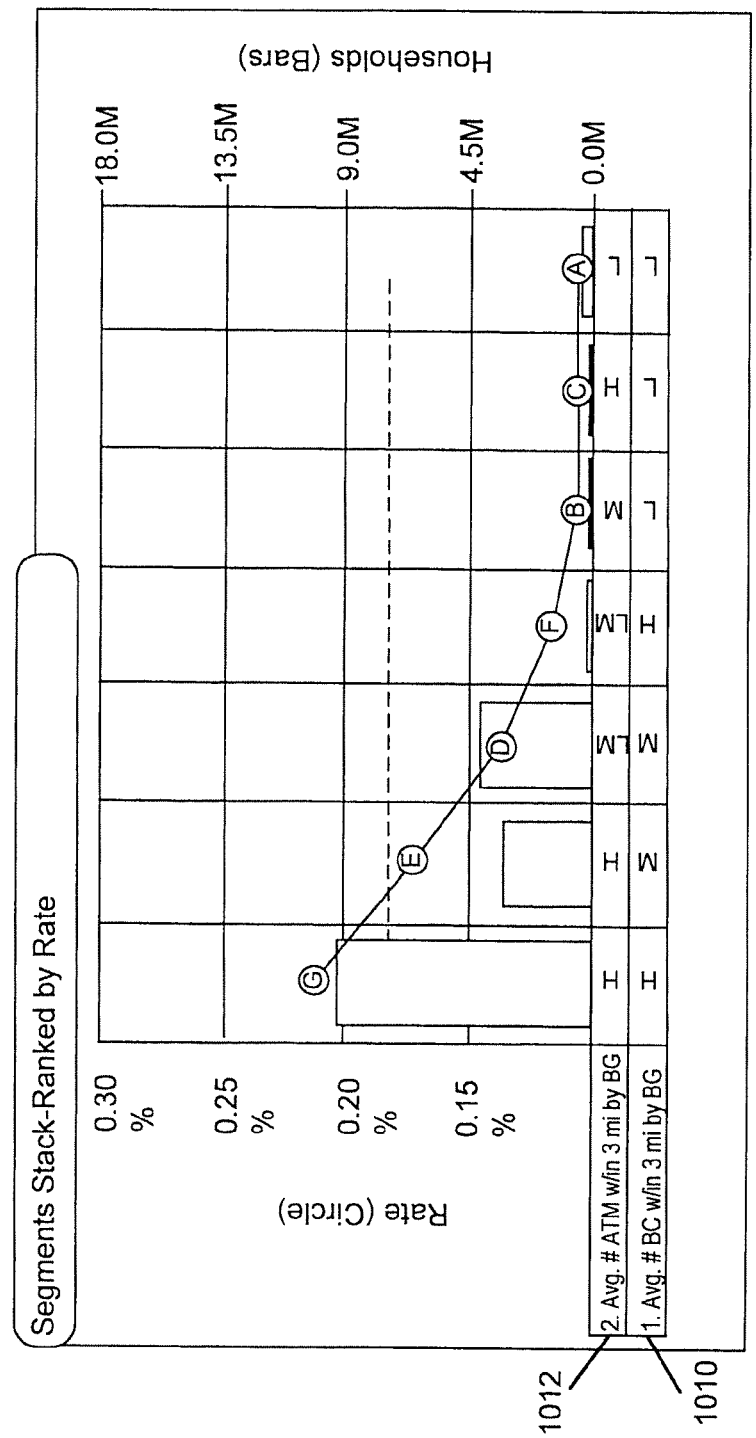
FIG. 11 is an illustration of an exemplary screenshot of a combined variable, according to an embodiment of the present invention.

FIG. 11 is an illustration of an exemplary screenshot of a combined variable of FIG. 9 by rate, according to an embodiment of the present invention. FIG. 11 shows the composite variable and its response curve. The rate is represented by the circles which correspond to the segments shown in FIG. 9. Also shown along the X axis is the corresponding household, e.g., bars. FIG. 11 illustrates how the variables interact with each other, as shown by 1010 and 1012. Where ATM number is high and BC number is high as shown by point G, the rate is over 0.20%. On the low side, regardless of the ATM number, when the BC number is low, the rate is consistently low as shown by point A, B and C, just above 0%. The order corresponds to the rate order, in this example, from high rate to low rate. Other orders and sorting may be applied to the combined variable.

Figure 12:
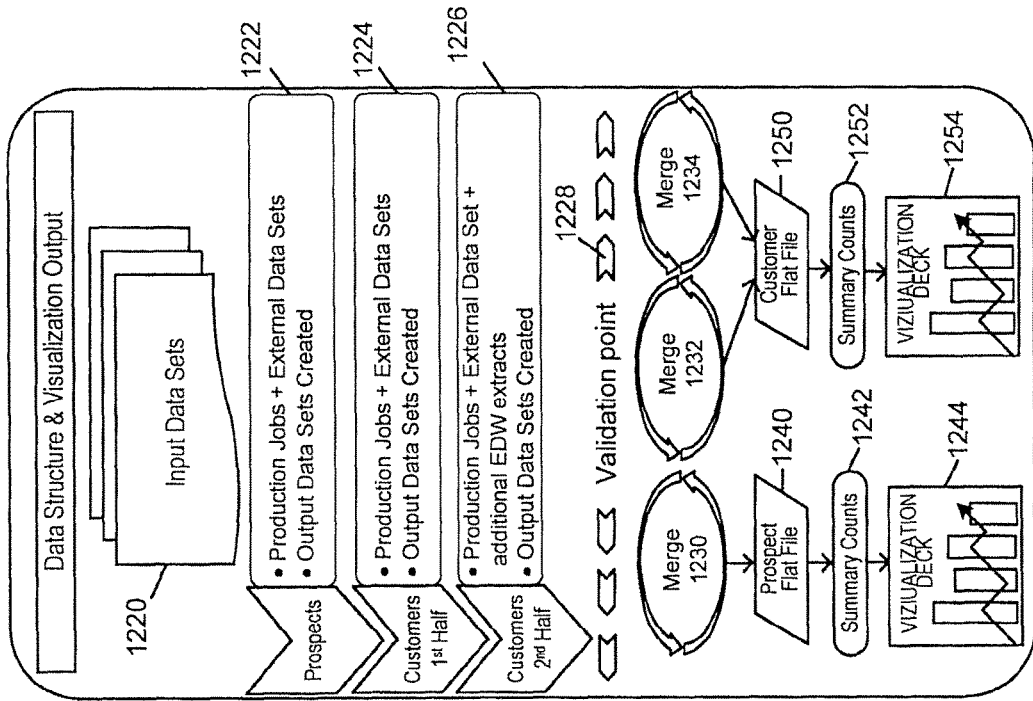
FIG. 12 is an exemplary flowchart illustrating a method for data preparation, according to an embodiment of the present invention.
Figure 12:
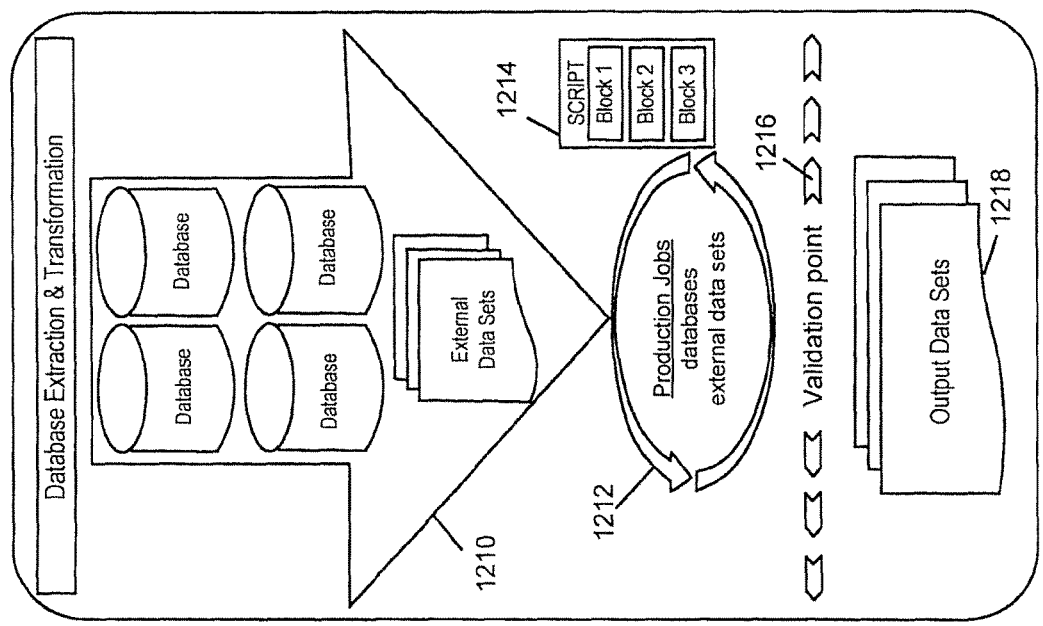

FIG. 12 is an exemplary flowchart illustrating a method for data preparation, according to an embodiment of the present invention. In this representation, database extraction is shown at 1210. Other external data sets may be retrieved as well. The data may then be transformed as shown by 1212. Here, scripts may be applied to the data as shown by 1214. The data may be validated at 1216. The output data sets 1218 may then be received for data structure analysis as shown as Input Data Sets 1220. Production jobs, external datasets and output data sets may be processed at 1222, 1224, 1226. The data may be then validated at 1228. After validation, the data may be merged as shown by 1230, 1232 and 1234. The data may be outputted into various forms, including visualization deck, 1244 and 1254. The visualization deck may be displayed on a computing device (e.g., computer, processor, mobile device, tablet, etc.) via an online interface.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by Processor 110 may be stored and cataloged in Database 140 which may comprise or interface with a searchable database. Database 140 may comprise, include or interface to a relational database. Other databases, such as a query format database, a Standard Query Language (SQL) format database, a storage area network (SAN), or another similar data storage device, query format, platform or resource may be used. Database 140 may comprise a single database or a collection of databases, dedicated or otherwise. In one embodiment, Database 140 may store or cooperate with other databases to store the various data and information described herein. In some embodiments, Database 140 may comprise a file management system, program or application for storing and maintaining data and information used or generated by the various features and functions of the systems and methods described herein. In some embodiments, Database 140 may store, maintain and permit access to participant information, transaction information, account information, and general information used to process transactions as described herein. In some embodiments, Database 140 is connected directly to Processor 110, which, in some embodiments, it is accessible through a network, such as communication network, e.g., 122, 124 illustrated in FIG. 1, for example.

Communications network, e.g., 122, 124, may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network, e.g., 122, 124, may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Fire-wire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 122, 124, may comprise a satellite communications network, such as a direct broadcast communication system (DBS) having the requisite number of dishes, satellites and transmitter/receiver boxes, for example. Communications network, e.g., 122, 124, may also comprise a telephone communications network, such as the Public Switched Telephone Network (PSTN). In another embodiment, communication network 120 may comprise a Personal Branch Exchange (PBX), which may further connect to the PSTN.

In some embodiments, Processor 110 may include any terminal (e.g., a typical home or personal computer system, telephone, personal digital assistant (PDA) or other like device) whereby a user may interact with a network, such as communications network, e.g., 122, 124, for example, that is responsible for transmitting and delivering data and information used by the various systems and methods described herein. Processor 110 may include, for instance, a personal or laptop computer, a telephone, or PDA. Processor 110 may include a microprocessor, a microcontroller or other general or special purpose device operating under programmed control. Processor 110 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Processor 110 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Processor 110 may also include a network-enabled appliance, a browser-equipped or other network-enabled cellular telephone, or another TCP/IP client or other device.

As described above, FIG. 1 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing perfottned by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. An automated computer implemented method for data preparation for model development, wherein the method is executed by a programmed computer processor which communicates with a user via a network, the method comprising the steps of:

initiating, via an input to a computer, creation of a new variable for a dataset for model generation, the new variable to be implemented in a model;

extracting, by the computer, data relevant to the new variable from one or more data sources;

processing, by the computer, the extracted data to automatically generate an input variable;

converting the extracted data from continuous values to a plurality of categorical values where associated attributes for each of the plurality of categorical values are represented as a decision tree, where the associated attributes each comprise a decision tree data structure that is dynamically modifiable by the user and specific to the associated attributes;

displaying, via a user interface, the processed data relative to a target variable and attribute interactions with one or more other attributes;

receiving a user interaction, via the user interface, to interact with a node of the decision tree structure, wherein the user interaction relates to one or more parameters that define the input variable;

executing, by the computer, the input variable by extracting code to generate the input variable to facilitate model development;

wherein the method further comprises identifying a second variable relevant to the target variable; and merging the input variable and the second variable to generate a composite variable;

wherein the data structure comprises a tree data structure with collapsible nodes; and wherein the input variable is created separately and independently of other variables.

2. The method of claim 1 further comprising the steps of:
accessing the input variable from a database; and
processing the input variable based on updated data.

3. The method of claim 1, wherein the input variable and the second variable comprises a data structure that is dynamically modifiable by the user.

4. The method of claim 1, wherein the collapsible nodes can be split, combined and adjusted.

5. The method of claim 1, wherein each of the input variable and the second variable is divided.

6. The method of claim 1, wherein the one or more data sources comprise external and internal sources of data.

7. The method of claim 2, further comprising the steps of:
accessing the input variable from the database to automatically generate a behavioral model.

8. A system for data preparation for model development, the system communicates with a user via a network and comprises:
a processor; and
a memory comprising computer-readable instructions which when executed by the processor cause the processor to perform the steps comprising:
initiating creation of a new variable for a dataset for model generation, the new variable to be implemented in a model;
extracting data relevant to the new variable from one or more data sources;
processing the extracted data to automatically generate an input variable;
converting the extracted data from continuous values to categorical values where associated attributes for each of the plurality of categorical values are represented as a decision tree, where the associated attributes each comprise a decision tree data structure that is dynamically modifiable by the user and specific to the associated attributes;
displaying the processed data relative to a target variable and attribute interactions with one or more other attributes;
receiving a user interaction to interact with a node of the decision tree structure, wherein the user interaction relates to one or more parameters that define the input variable; and
executing the input variable by extracting code to generate the input variable to facilitate model development;
wherein the processor further performs the steps of:
identifying a second variable relevant to the target variable; and
merging the input variable and the second variable to generate a composite variable;
wherein the data structure comprises a tree data structure with collapsible nodes; and
wherein the input variable is created separately and independently of other variables.

9. The system of claim 8, wherein the processor further performs the steps of:
accessing the input variable from a database; and
processing the input variable based on updated data.

10. The method of claim 8, wherein the input variable and the second variable comprises a data structure that is dynamically modifiable by the user.

11. The method of claim 8, wherein the collapsible nodes can be split, combined and adjusted.

12. The method of claim 8, wherein each of the input variable and the second variable is divided.

13. The system of claim 8, wherein the one or more data sources comprise external and internal sources of data.

14. The system of claim 9, wherein the processor further performs the steps of:
accessing the input variable from the database to automatically generate a behavioral model.

* * * * *